United States Patent [19]

Ring

[11] 3,952,607

[45] Apr. 27, 1976

[54] VARIABLE SPEED DRIVE MEANS

[75] Inventor: Thomas F. Ring, Indianapolis, Ind.

[73] Assignee: P. R. Mallory & Co. Inc., Indianapolis, Ind.

[22] Filed: Jan. 24, 1975

[21] Appl. No.: 543,782

[52] U.S. Cl. .................................... 74/393; 74/435
[51] Int. Cl.² ..................... F16H 55/04; F16H 35/02
[58] Field of Search ..................... 74/393, 437, 435

[56] References Cited
UNITED STATES PATENTS

| | | | |
|---|---|---|---|
| 1,700,361 | 1/1929 | Asbury | 74/393 UX |
| 2,261,723 | 11/1941 | Hoffman | 74/393 X |
| 2,594,466 | 4/1952 | Luther | 74/393 X |
| 2,956,445 | 10/1960 | Janoska | 74/393 |
| 3,098,399 | 7/1963 | Berthiaume | 74/437 X |
| 3,590,661 | 7/1971 | Chaveneaud | 74/437 X |

*Primary Examiner*—Leonard H. Gerin
*Attorney, Agent, or Firm*—Charles W. Hoffmann; Robert F. Meyer; Donald W. Hanson

[57] ABSTRACT

A driver member rotates at a constant speed through and past 360° and a driven member responsive to the rotation of the driver member rotates at an increasing or decreasing speed during a major portion of the 360° rotation, there being a means maintaining the driver and driven members in engagement during and past 360° rotation.

11 Claims, 3 Drawing Figures

VARIABLE SPEED DRIVE MEANS

Generally speaking the present invention relates to a drive means providing a variable speed output which in general comprises a driver member rotating at a constant speed through 360°, a driven member responsive to the rotation of the driver member and rotating at an increasing speed through a major portion of the 360° rotation, and means maintaining the driver and driven members in engagement continuously during the 360° rotation.

The present invention relates to improvements in drive mechanisms of the type described in U.S. Pat. Nos. 2,261,723 and 2,565,017. More particularly the invention relates to improvements in the gearing mechanisms described in the patents as providing a logarithmic scale and an output in accordance with such logarithmic scale. As discussed in the patents, such arrangements are particularly useful in timing mechanism wherein errors in settings may vary in importance depending upon the overall time interval involved.

One of the problems associated with such gearing mechanisms is that they are unable to rotate past 360°. This is true of the logarithmic gearing arrangement of the referenced patents. Thus in the referenced patents the timing mechanisms have to be manually returned to a zero setting upon engagement of the toothless portion of the gear profiles with each other. This of course limits the versatility of the timing mechanism.

It is, therefore, a feature of the present invention to provide a drive means wherein a driver member rotates at a constant speed past 360° and a driven member responsive to the driver member rotates at an increasing speed through a major portion of the 360°, both members cooperatively being capable of rotating past 360°. Another feature of the invention is to provide a pair of complimentary non-circular gears rotating past 360°. Another feature of the invention is to provide such a pair of complimentary gears which are capable of rotating past 360° in either direction and means maintaining the gears in engagement continuously through such rotation. Still another feature of the invention is to provide complimentary scroll gears having relief means such that they can rotate past 360° and means maintaining the gears in engagement through such rotation. Yet another feature of the invention is the provision of complimentary scroll gears having a means providing smooth rotation of the gears as the gear profile at the largest diameter of a gear engages the gear profile of the other gear at its minimum diameter. These and other features of the invention will become apparent from the following description taken in conjunction with the accompanying drawings in which:

Figure 1:
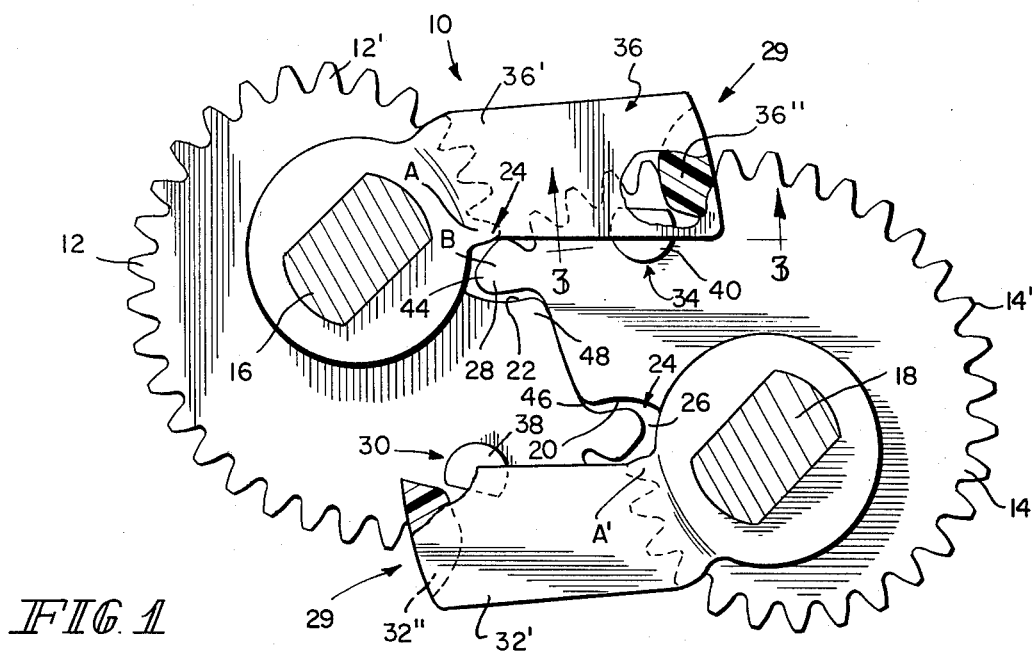
FIG. 1 is a plan view of the drive means of the present invention.

Referring to the drawings, the drive means 10 includes, in general, a driver member 12 and a driven member 14 each carried on a rotatable shaft 16 and 18 respectively. It should be understood that the relationship of the driver member and driven member could be reversed, the relationship shown being only for illustrative purposes. Both the shafts would be suitably journalled in a frame (not shown) and shaft 16 would be coupled to a suitable driver (not shown) such as a synchronous motor, the shaft being coupled to the motor through a speed reducing means such as a gear train. Such journalling of the shafts and the coupling of the shaft 16 to a motor are well known in the art and need not be described with respect to the invention.

In the illustrative embodiment, the driver and driven members include a pair of complementary noncircular gears, the gears being scroll type gears. Each scroll gear has minimum and maximum diameters indicated at points A, A' and B,B' respectively. Surfaces 20 and 22 provide pitch lines between the minimum and maximum diameters of the gears. Gear teeth 12' and 14' in the illustrative embodiment provide a logarithmic scale and are complimentary with respect to each other. Other scales such as an archimidies scale may be used. Shafts 16 and 18 are so positioned with respect to each other that the two will mesh with each other during normal operation of the gears. However, as will be described hereinafter, a condition or conditions may exist wherein the gears could become disengaged and therefore the present invention provides for a means to insure continuous engagement of the gears. During normal operation of the gears, rotation of shaft 16 at a constant speed causes shaft 18 to rotate at varying speeds according to the particular portions of gears 12 and 14 that are in engagement with other. Shaft 18 may be coupled to a device or element to be driven at the varying speed. For example, a cam stack normally used in timing mechanisms may be carried by the shaft.

What has been described thus far is typical of noncircular gears described in the afore-mentioned U.S. patents. As previously noted, these types of noncircular gears were, prior to the present invention, unable to rotate past 360°. The present invention has overcome this problem by providing a relief means 24 in each of the gears whereby the gears will not lock when surfaces 20 and 22 become engaged and therefore will be able to rotate past 360°. Relief means 24 includes a circular notch 26 provided at the intersection between the last gear tooth at the minimum diameter of the scroll gears and the surface 20 or 22 forming the pitch line between the maximum and minimum diameters of the scroll gears. The notch provides an entry for the last tooth 28 at the maximum diameter so that there will be no binding or locking of the gears as the surfaces 20 and 22 approach each other.

While the use of the relief means makes it possible to permit the gears to rotate past 360°, it does in some instances cause a problem in that under certain conditions the gears may become disengaged. More specifically because of the notch 26 a portion of the gear meshing is lost. This makes it possible for the gears to become disengaged. This problem has been overcome by providing a means 29 for maintaining the gears in engagement continuously during and past the 360° rotation of the gears. Such means includes stop means 30, 34 carried on gears 12 and 14 respectively and cooperating restraining members 32, 36 carried on shafts 16 and 18 respectively to be rotated therewith. As shown, stop means 30, 34 include bosses 38, 40, while restraining members 32, 36 each include an arm 32', 36' each having a lug 32'', 36'' carried at its distal end. The use of two combinations of stop means and restraining members insures that the gears will remain engaged regardless of the direction of rotation of the gears.

Figure 2:
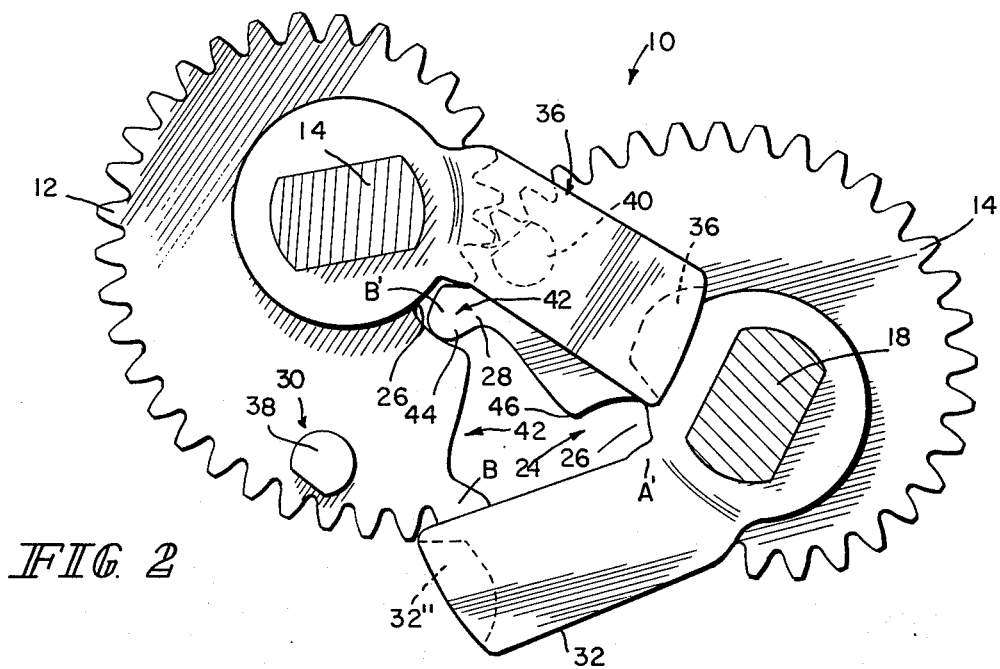
FIG. 2 is a view similar to that of FIG. 1 showing the drive means in a different position of rotation.
Figure 3:
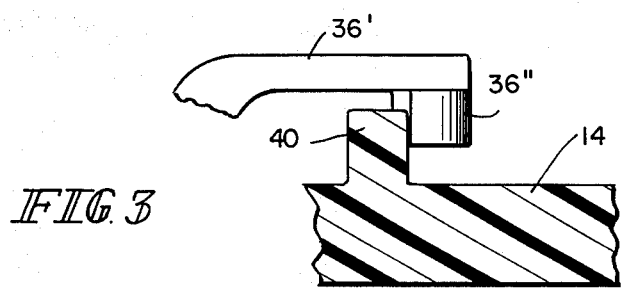
FIG. 3 is a section taken along the line 3-3 of FIG. 1.

As shown in FIGS. 1 and 2, gear 12 is rotating clockwise and gear 14 is rotating counter clockwise. In FIG.

1, the gears have just reached the point where they have completed a 360° rotation such that surfaces 20 and 22 are engaged. In prior art scroll gearing arrangements, the gears, at this point, had to be reversed and returned to a "zero setting". But because of the relief means the gears are able to continue to rotate, as shown in FIG. 2, past the 360° point. The gears have remained in engagemennt by virtue of lug 36″ engaging boss 40. If the direction of rotation is reversed, continuous engagement of the gears will be insured through engagement of lug 32″ engaging boss 38. Such reversal of direction would permit a decreasing of the output speed through a major portion of the 360° rotation.

According to another feature of the invention there is provided a means 42 providing a smooth rotation of the gears as the gear profile at the largest diameter B or B′ of the gear engages the gear profile of the other gear at its minimum diameter A or A′ such that there is a minimum sliding action between the surfaces in contact. Such means includes an enlarged portion 44 of the last gear at the largest diameter of the gear and the smooth rise and fall contour of the surfaces 20 and 22 with a raised portion 46 and 48 disposed between the maximum and minimum diameters.

What is claimed is:

1. A drive means comprising:
   a. a driver member carried on a shaft and rotating at a constant speed through and past 360°,
   b. a driven member carried on a shaft and responsive to the rotation of said driver member and rotating through and past 360° and at a variable speed through at least a major portion of said 360° rotation, and
   c. means maintaining said driver and driven members in engagement continuously during and past said 360° rotations.

2. A drive means according to claim 1 wherein said driver and driven members are complimentary noncircular gears meshing with each other and wherein said drive means further includes means permitting each of said gears to rotate through and past said 360° rotations.

3. A drive means according to claim 2 wherein said complimentary noncircular gears are scroll gears.

4. A drive means according to claim 3 wherein said means permitting each of said gears to rotate through and past said 360° rotations includes a relief means in each of said gears whereby said gears by-pass an area within which said gears become locked.

5. A drive means according to claim 4 wherein said relief means includes a circular notch provided at the intersection between the last gear tooth at the minimum diameter of said scroll gears and a surface forming a pitch line between the maximum and minimum diameters of said scroll gears.

6. A drive means according to claim 3 further including means providing smooth rotation of said scroll gears as the gear profile at the largest diameter of a scroll gear engages the gear profile of the other scroll gear at its minimum diameter.

7. A drive means according to claim 3 wherein said means maintaining said gears in engagement includes a stop means carried by one of said scroll gears and a restraining member carried by the other of said scroll gears engaging said stop means.

8. A drive means according to claim 7 wherein said stop means includes a boss extending from said scroll gear and said restraining member includes an arm extending from said shafts and a lug carried at a distal end of said arm and engaging said boss.

9. A drive means according to claim 7 wherein said complimentary scroll gears are rotatable in either direction and said means maintaining said gears in engagement includes a stop means carried on each of said scroll gears, each of said restraining members engaging opposite ones of said stop means.

10. A drive means according to claim 6 wherein said means providing a smooth rotation includes a surface providing a pitch line between the maximum and minimum diameters of said scroll gears, said surface including a smooth rise and fall contour having a raised portion disposed between said maximum and minimum diameters.

11. A drive means according to claim 10 wherein said means permitting each of said gears to rotate through and past a 360° rotation includes a notch provided at the intersection between the last gear tooth at the minimum diameter of said gears and a surface forming a pitch line between the maximum and minimum diameters of said scroll gears and wherein said means providing a smooth rotation further includes an enlarged portion extending from the last gear tooth at said minimum diameter and engaging said notch so as to achieve a minimum of sliding action between the surfaces in contact.

* * * * *